United States Patent
Kling et al.

(10) Patent No.: US 6,662,203 B1
(45) Date of Patent: Dec. 9, 2003

(54) BATCH-WISE HANDLING OF SIGNALS IN A PROCESSING SYSTEM

(75) Inventors: Lars-Örjan Kling, Södertälje (SE); Sten Edvard Johnson, Farsta (SE); Per Anders Holmberg, Stockholm (SE); Terje Egeland, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/438,922

(22) Filed: Nov. 12, 1999

(30) Foreign Application Priority Data

Nov. 16, 1998 (SE) .............................................. 9803901
Mar. 29, 1999 (SE) .............................................. 9901146

(51) Int. Cl.$^7$ ................................................ G06F 9/00
(52) U.S. Cl. ........................ 709/103; 709/101; 709/102; 709/207
(58) Field of Search ................................ 709/102, 103, 709/101, 207

(56) References Cited

U.S. PATENT DOCUMENTS

| | | | |
|---|---|---|---|
| 5,072,364 A | 12/1991 | Jardine et al. | |
| 5,195,181 A | 3/1993 | Bryant et al. | |
| 5,239,539 A | 8/1993 | Uchida et al. | |
| 5,287,467 A | 2/1994 | Blaner et al. | |
| 5,379,428 A | * 1/1995 | Belo | ............ 709/103 |
| 5,511,172 A | 4/1996 | Kimura et al. | |
| 5,560,029 A | 9/1996 | Papadopoulos et al. | |
| 5,740,393 A | 4/1998 | Vidwans et al. | |
| 5,781,753 A | 7/1998 | McFarland et al. | |
| 5,787,300 A | 7/1998 | Wijaya | |
| 5,812,839 A | 9/1998 | Hoyt et al. | |
| 5,832,262 A | * 11/1998 | Johnson et al. | ............ 709/102 |
| 5,848,257 A | 12/1998 | Angle et al. | |
| 5,870,597 A | 2/1999 | Panwar et al. | |
| 5,875,326 A | 2/1999 | Cheong et al. | |

FOREIGN PATENT DOCUMENTS

| | | |
|---|---|---|
| EP | 230721 | 8/1987 |
| JP | 3263164 | 11/1991 |
| JP | 4100449 | 4/1992 |
| JP | 5274279 | 10/1993 |
| JP | 6276198 | 9/1994 |
| JP | 10143382 | 5/1998 |
| WO | 88/02513 | 4/1988 |
| WO | 99/31589 | 6/1999 |

OTHER PUBLICATIONS

Multiscalar Processors, Computer Sciences Department, University of Wisconsin–Madison, Madison, WI 53706, Gurindar S. Sohi, et al.

The Effect of Speculative Execution on Cache Performance, University of Michigan, Jim Pierce, et al, 0–8186–5602–6/941994 IEEE.

(List continued on next page.)

*Primary Examiner*—Ramesh Patel
*Assistant Examiner*—Thomas Pham (57) ABSTRACT

The present invention relates to multiprocessing systems in which signals or processes are scheduled in order of their priority level. The invention is based on batch-wise acceptance and scheduling of job signals, and utilizes at least one delay queue for temporarily storing job signals to the processing system before they are accepted for scheduling. The processing system further comprises circuitry for batch-wise insertion of the temporarily stored job signals into the job scheduler of the multiprocessing system. In this way, the utilization of the parallel processing units is increased and the number of changes between different priority levels in the multiprocessing system is minimized.

19 Claims, 5 Drawing Sheets

OTHER PUBLICATIONS

Hardware for speculative Run–Time Parallelization in distributed Shared–Memory Multiprocessors, University of Illinois at Urbana–Champaign, IL 61801, Ye Zhang, et al, 0–8186–8323–6/98 1998 IEEE.

*Operating System Concepts*, Abraham Silberschatz, et al. Addison–Wesley Series in Computer Science, Jun., 1988, Chapter 4, pp. 149–185.

MAJC™Documentation, First MAJC™Implementation Presentation, MAJC–5200: A VLIW Convergent MPSOC by Marc Tremblay, Chief Architect, Microprocessor Forum, Oct. 1999; Introduction to the MAJC™ Architecture; MAJC Architecture Presentation; and MACK Architecture Tutorial, at http://wwwwseast.usec.sun.com/ microelectronics/ MAJC/documentation, Nov. 10, 1999.

* cited by examiner

BATCH-WISE HANDLING OF SIGNALS IN A PROCESSING SYSTEM

BACKGROUND

The present invention generally relates to processing systems, and more particularly to multiprocessing systems having multiple processing units.

Many conventional central processing systems, such as the APZ processor in the known AXE Digital Switching System from Telefonaktiebolaget LM Ericsson, are built around a single processing unit, referred to as an execution pipeline in the AXE system. However, central processing systems based on a single processing unit have limitations with regard to capacity.

One way of increasing the processing capacity is to build the processing system as a multiprocessing system, i.e. a processing system with multiple processing units operating in parallel. When having multiple processing units operating in parallel, the scheduling algorithm must offer high utilization of the processing units. In many multiprocessing systems, the scheduling is performed in order of the priority level of the jobs, tasks or processes to be executed. In this way, the available capacity may be directed towards jobs of high priority levels at first, and subsequently the capacity may be directed towards jobs of lower priority levels. However, each time a job of higher priority level arrives to the processing system, it will normally interrupt execution of a job of lower priority level. This will generally lead to a high number of priority level changes, and inefficient use of the execution capacity. In fact, it may be difficult to guarantee that any time at all is devoted to jobs of lower priority levels, even if a load regulation mechanism is used for limiting the total system load.

Furthermore, executing a single job or just a few jobs in the multiprocessing system is a waste of resources, since only one or a few of the multiple processing units are utilized. Consequently, whenever a high and stable flow of jobs to the multiple processing units can not be ensured, the parallel execution capacity of the multiple processing units is not fully utilized, thus degrading the performance of the processing system.

SUMMARY

The present invention overcomes these and other drawbacks of the prior art arrangements.

It is a general object of the present invention to provide a multiprocessing system in which the multiple processing units are enabled to operate in a more efficient manner than in multiprocessing systems of the prior art, and in which the number of priority level changes is minimized.

In particular, it is desirable to obtain a multiprocessing system in which the time available for execution of jobs, tasks or processes of lower priority levels is considerably increased at the same time as the multiprocessing system operates efficiently at all priority levels.

Yet another object of the invention is to provide a method for handling signals in a processing system having multiple processing units.

These and other objects are met by the invention as defined by the accompanying patent claims.

The present invention is mainly directed to a multiprocessing system in which signals or processes are scheduled in order of their priority level.

Briefly, the invention is based on batch-wise acceptance and scheduling of job signals. For this purpose, the invention utilizes at least one delay queue for temporarily storing job signals to the processing system before they are accepted for scheduling, and circuitry for batch-wise insertion of the temporarily stored job signals into the job scheduler of the multiprocessing system. In this way, the utilization of the parallel processing units is increased and the number of changes between different priority levels in the multiprocessing system is minimized or at least reduced, as will be explained in more detail in the description of embodiments.

As mentioned above, processing a single job, task or process in the multiprocessing system is a waste of resources. Delaying external signals in the delay queue and accepting a batch of the delayed signals for scheduling and subsequent processing by the multiple processing units makes it more likely that several signals are available for parallel processing at once.

Between the batch-wise insertions of job signals, new job signals that arrive to the processing system are collected and delayed in the delay queue. In this period of time, as soon as all the scheduled jobs of higher priority levels have been executed, the scheduler is free to start forwarding jobs of lower priority levels to the parallel processing units without the interference from job signals of higher priority levels arriving to the delay queue. Consequently, another purpose of the delay queue is to free time for execution of low priority jobs. In addition, system load can be estimated in a simple manner by measuring the amount of time left for execution of jobs of lower priority levels.

Preferably, the processing system comprises an individual delay queue for each priority level. Advantageously, each delay queue is associated with a corresponding job buffer in the job scheduler, and the job signals of each delay queue are transferred batch-wise to its corresponding job buffer.

The invention is not limited to the management of job signals that directly trigger the execution of corresponding jobs. Many commercial operating systems work with predefined processes. In such processing systems, each incoming signal is directed to its corresponding process, and the scheduling is performed on the processes and not based on the incoming signals. According to an alternative embodiment of the invention, the delay queue is utilized for temporarily storing process signals, and the process signals of the delay queue are inserted batch-wise into a process handler which directs the process signals to corresponding processes having different priority levels. Subsequently, the processes are scheduled for parallel execution by the multiple processing units in order of their priority level.

The invention offers the following advantages:
- efficient utilization of the parallel execution capacity of the multiple processing units;
- the number of changes between different priority levels is minimized or at least reduced;
- the time available for execution of jobs, tasks or processes of lower priority levels is considerably increased at the same time as the multiprocessing system operates efficiently at all priority levels; and
- system load can be measured in a simple manner.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Throughout the drawings, the same reference characters will be used for corresponding or similar elements.

Figure 1:
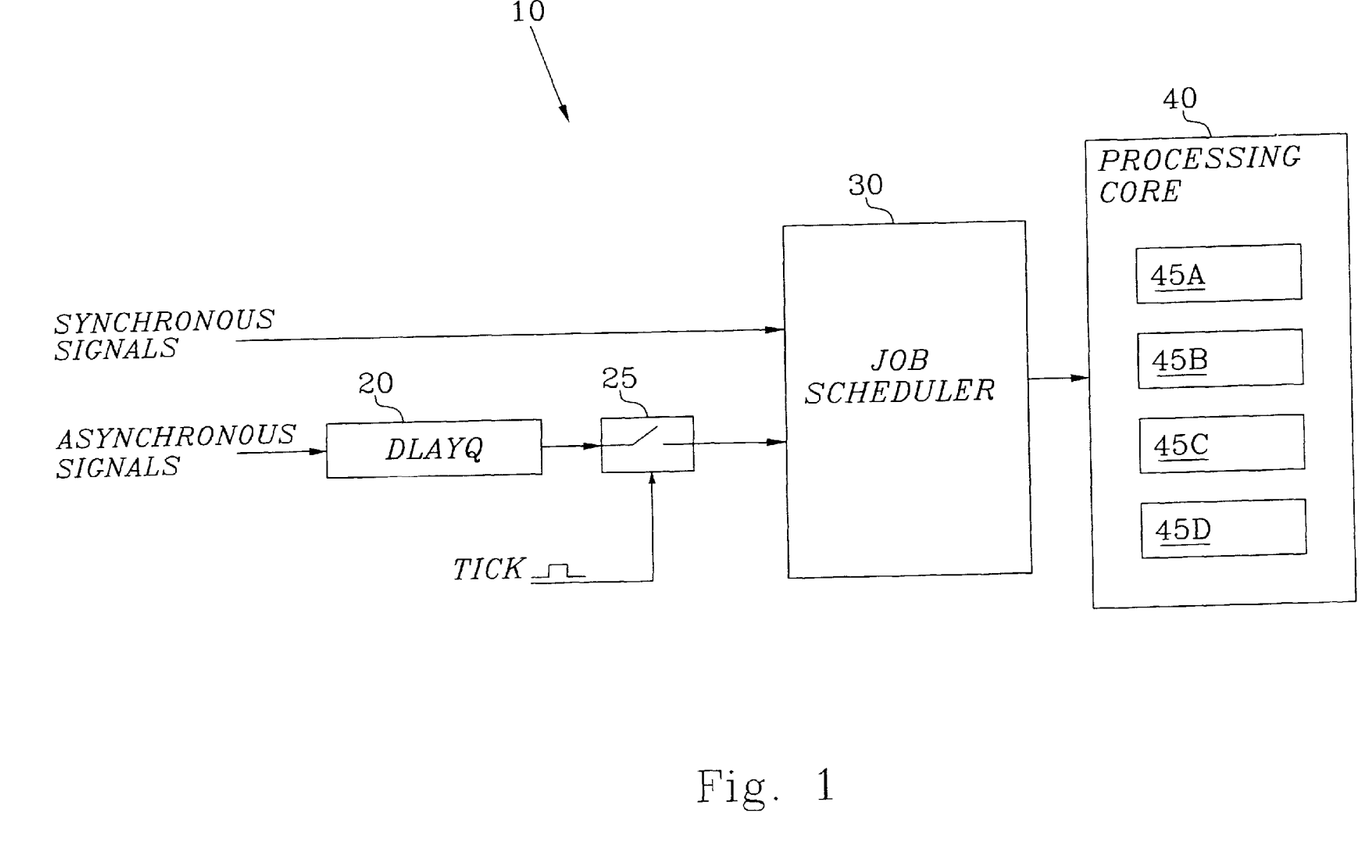
FIG. 1 is a schematic diagram of a processing system according to a first embodiment of the invention.

FIG. 1 is a schematic diagram of a processing system according to a first embodiment of the invention. The processing system 10 basically comprises a delay queue 20, a switch 25, a job scheduler 30 and a processing core 40 having multiple processing units 45A–D operating in parallel. The processing units may be specialized hardware or standard off-the-shelf microprocessors. The processing units 45A–D process job signals that are scheduled by the job scheduler 30 to execute corresponding jobs. The job signals arriving to the processing system generally have different priority levels, and the job scheduler 30 schedules the incoming job signals for execution in order of their priority level. The job scheduler transfers the job signals of the highest priority level to the processing core 40. Preferably, the processing units 45A–D simultaneously operate at the same priority level, implying that job signals of only one priority level at a time are processed by the processing core 40. This means that signals of a higher priority level from the job scheduler 30 will interrupt jobs of a lower priority level. The job scheduler 30 may initiate an interrupt by sending an interrupt request to the processing core 40, and the processing core will then interrupt the jobs currently executing in the processing core 40.

Incoming job signals are either "synchronous", originating from jobs executed in the processing core or "asynchronous" originating from external events that are asynchronous to the job execution. Asynchronous job signals may arrive as job requests from external units such as regional processors or other processors connected to the processing system. In the case of external job signals, the system can be regarded as event-driven. However, in order to fully utilize the parallel execution capacity of the multiple processing units 45A–D, a high and stable flow of job signals to the processing units must be ensured. In general, this is not the case for external asynchronous signals, which in fact may arrive to the processing system more or less at random. Therefore, the invention proposes temporarily storage and delay of the asynchronous job signals in the delay queue 20 to enable batch-wise acceptance of the delayed job signals for scheduling. Accepting batches of job signals for scheduling instead of accepting the job signals as they arrive to the system, makes it more likely that several signals are available for execution at once. By delaying the job signals in the delay queue 20, and inserting the delayed signals to the job scheduler 30 batch-wise, the processing core 40 will operate efficiently at all priority levels, and the number of changes between priority levels in the processing core 40 will be minimized.

Synchronous job signals, however, are normally inserted directly into the job scheduler in the order they arrive. In this way, the overall scheduling order of the processing system is preserved.

Preferably, the delay queue 20 is implemented as a queue of pointers to job signals, or job descriptors, in a common memory where the real information needed for starting the jobs are located. The job signals can then be moved from the delay queue 20 to the job scheduler 30 simply by moving the pointers.

The batch-wise insertions of the job signals stored in the delay queue 20 into the job scheduler are determined by a tick period counter (not shown) generating a control signal TICK to the switch 25. The tick period counter triggers the transfer of job signals from the delay queue 20 to the job scheduler 30 each time it has counted down to zero. The counter then reloads itself with a start value from a register and starts counting down again. The period can be changed by writing a new value into the start value register. If the delay queue 20 becomes full before the counter reaches zero, then a congestion warning is generated and the delay queue may start to empty itself without waiting for the counter to reach zero.

The increased efficiency is however achieved at the price of increased latency for the asynchronous signals. If 5 ms intervals are used for the transfer from the delay queue 20 to the job scheduler 30, the average extra delay of the job signals will be 2.5 ms. This is considered to be a very reasonable trade-off. If there are 500 job signals/ms arriving to the processing system, and 5 ms intervals are used for the delay queue, the average length of the delay queue should be greater than 2500 job signals in order to avoid congestion.

In most computers and processing systems, the resolution of timer started jobs is in the range of a ms. This means that timer jobs will be released only once a ms anyhow, making it unnecessary to treat them as asynchronous jobs.

Although the delay queue 20 and the switch 25 have been described as implemented in hardware above, a software implementation is also possible. Software can be used in the management of the delay queue. In this case, the delay queue 20 would be implemented in a common memory accessible by the processing system. Preferably, the job signals are collected in the delay queue 20 by a software interrupt routine servicing the input/output circuit of the processing system. Also, the transfer of job signals from the delay queue 20 into the job scheduler 30 can be performed by software, preferably by an interrupt routine started by a periodic clock interrupt. However, it should be noted that if timer interrupts are used in transferring job signals from the delay queue, the timer interrupt jobs can not be passed through the delay queue, but have to be forwarded directly to the job scheduler.

Figure 2A:
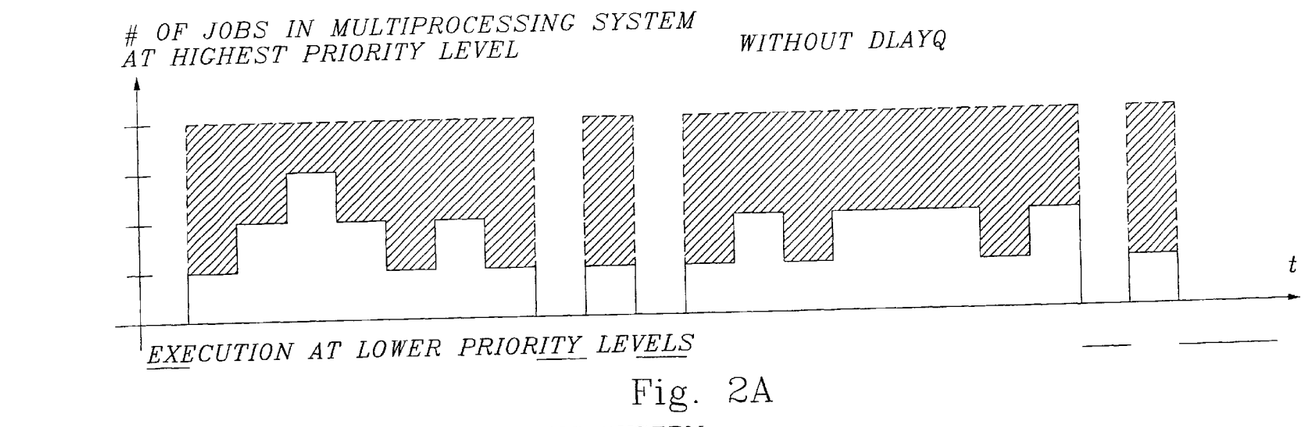
FIG. 2A is a schematic diagram illustrating an example of the number of jobs in the multiprocessing system at the highest priority level as a function of time when no delay queue is utilized.

FIG. 2A is a schematic diagram illustrating an example of the number of jobs in the multiprocessing system at the highest priority level as a function of time when no delay queue is utilized. Under the assumption that the multiprocessing system comprises four processing units, it can be seen from FIG. 2A that the multiprocessing system operates far from optimally, with only one or two and occasionally three jobs in the processing units. Besides, the multiprocessing system has to work on the highest priority level almost all of the available time, leaving very little time for execution at lower priority levels, as indicated by the lines below the t-axis in FIG. 2A.

Figure 2B:
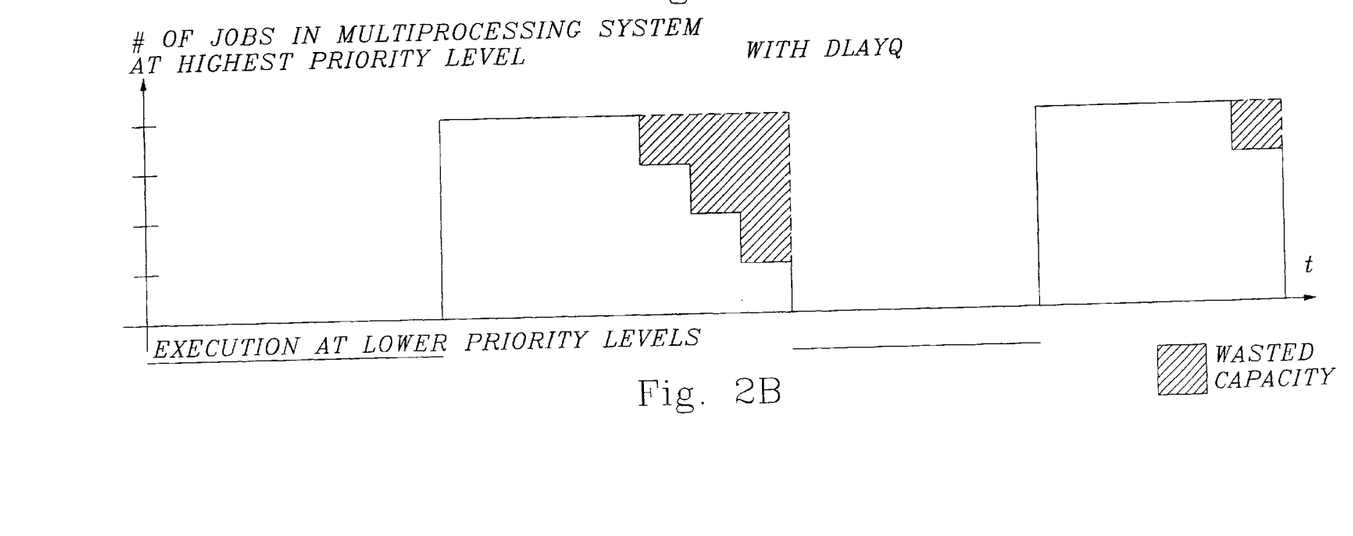
FIG. 2B is a schematic diagram illustrating an example of the number of jobs in the multiprocessing system at the highest priority level as a function of time when a delay queue is utilized.

FIG. 2B is a schematic diagram illustrating an example of the number of jobs in the multiprocessing system at the highest priority level as a function of time when a delay queue is utilized. As can be seen, the multiprocessing system is utilized much more efficiently, executing the maximum number of jobs for relatively long periods of time. By collecting job signals in the delay queue and using batch-wise acceptance of the job signals for scheduling, job signals at the highest priority level are processed very efficiently until the remaining number of scheduled job signals to be processed becomes smaller than the number of processing units. At this point, the number of jobs in the multiprocessing system starts fading out towards zero, and the wasted capacity is limited to this period of time. When all jobs at the highest priority level have been executed, the multiprocessing system can start executing jobs of a lower priority level until the next batch of job signals from the delay queue is inserted for scheduling and subsequent processing. This means that the time available for executing lower-priority jobs increases considerably as indicated by the lines below the t-axis in FIG. 2B.

By comparing FIG. 2A and FIG. 2B, it can be seen that the number of changes between different priority levels is considerably smaller when a delay queue is utilized.

It should be understood that FIGS. 2A and B are schematic figures, and that the total number of jobs executed at each priority level normally is much larger than illustrated in the figures. By way of example, a total number of 2500 jobs may be executed in a 5 ms interval used for the delay queue.

Another advantage is that system load can be estimated by simply measuring the amount of time left for executing jobs of lower priority levels.

Figure 3:
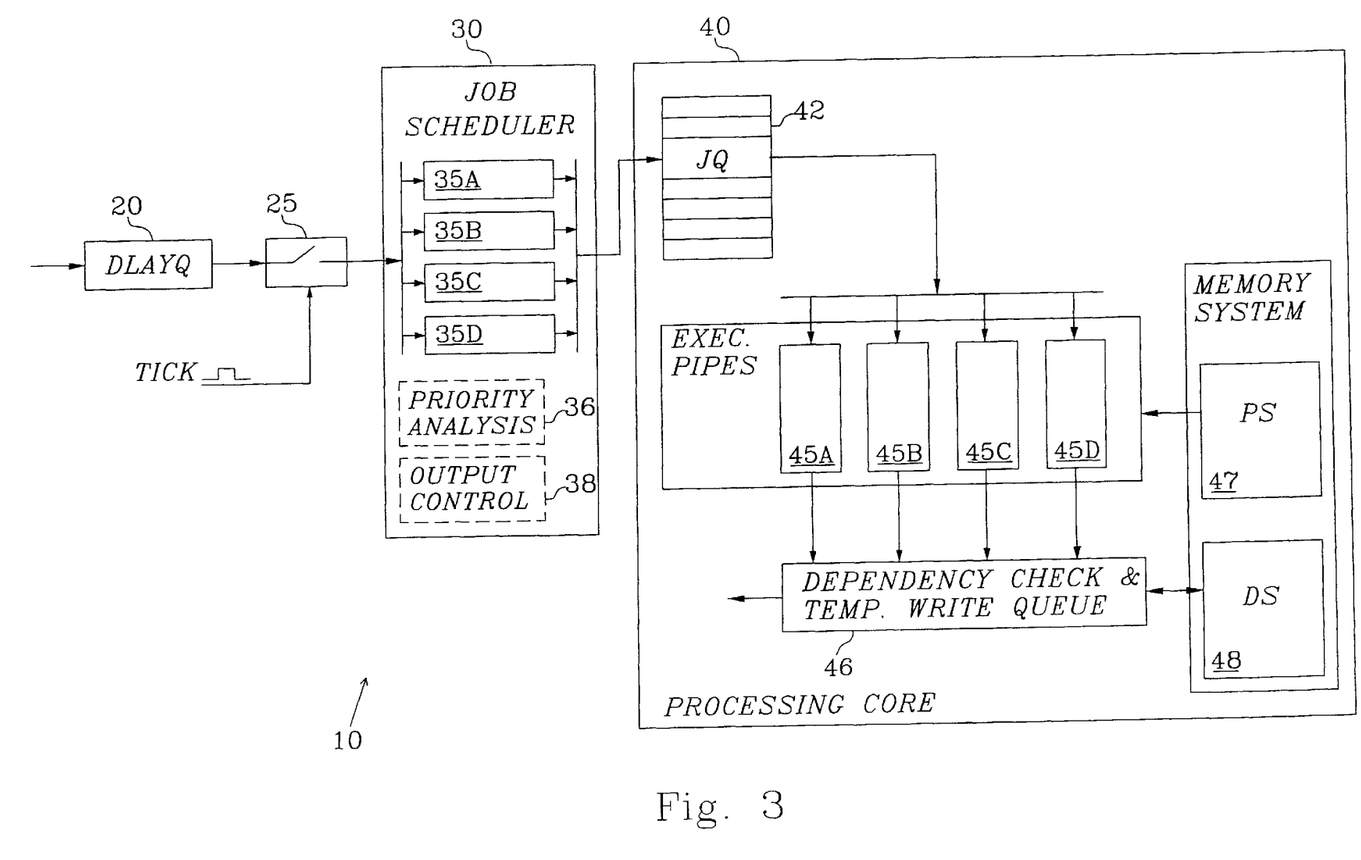
FIG. 3 is a schematic diagram of an illustrative example of a realization of the processing system of FIG. 1.

FIG. 3 is a schematic diagram of an illustrative example of a realization of the processing system of FIG. 1. The processing system 10 comprises a delay queue 20, a switch 25, a job scheduler 30 and a processing core 40. In this particular realization example, the processing core 40 is adapted for speculative execution of jobs, and the processing units 45A–D used by the processing core 40 are preferably in the form execution pipelines.

The job scheduler 30 comprises a number of job buffers 35A–D, a priority analysis unit 36 and an output control unit 38. The job scheduler 30 receives job signals from the delay queue 20 in batches, and distributes the job signals into the job buffers for later transfer to the processing core 40. By using several job buffers, instead of just one, it is possible to handle priorities; job signals with different priority levels can be stored in different buffers. Each incoming job signal has a header that includes information about the priority level of the job signal. Consequently, when a new job signal arrives to the job scheduler 30 the header is analyzed in the priority analysis unit 36 and the job buffer into which the job signal should be placed is identified. Next, the job signal is placed in the selected job buffer where it awaits to be forwarded to the processing core 40 under the control of the output control unit 38. The job buffers 35A–D are normally organized as first-in-first-out queues, and the job buffers are served by the processing core 40 in order of priority. When the processing core 40 is ready to accept a new job signal, the scheduler 30 takes a signal of the highest priority level from the job buffers and forwards it to the processing core 40.

An example of a specific type of job scheduler is the signal-processing unit (SPU) in the known AXE Digital Switching Systems from Telefonaktiebolaget LM Ericsson. However, it should be noted that the interrupt handling in the job scheduler 30 used by the invention should be able to initiate an interrupt of jobs in the processing core 40 if a job signal of higher priority level is sent from the scheduler to the processing core. Preferably, the processing core 40 processes job signals of only one priority level at a time. Signals of higher priority levels from the job scheduler 30 will interrupt signals of lower levels. For example, the scheduler 30 may initiate an interrupt by sending an interrupt request to the processing core 40, and the core 40 will then interrupt the jobs currently executing in the execution pipelines.

According to an alternative solution, the execution pipes are allowed to start executing jobs speculatively also on lower priority levels. The performance gain is however limited by the fact that the number of changes between different priority levels already have been minimized by the invention.

The processing core 40 basically comprises a job queue 42, a plurality of execution pipelines 45A–D, a combined dependency checking unit and temporary write queue 46 for handling data dependencies, and a memory system divided into a program store 47 and a data store 48.

The job signals from the job scheduler 30 are buffered in the job queue 42, which has a number of storage positions for storing the job signals. Each job signal is stored in a respective storage position of the job queue 42. In general, each job signal comprises a header and data. In addition to administrative information such as priority level data, the header normally includes a pointer to software code in the program store 47, and the data of the job signal includes input operands necessary for execution of the corresponding job, thus generally making the job signal self-contained. The data could be a signal message from an external unit such as a regional processor or another processor. A job may be defined as the instruction stream specified by the signal header, and the job starts with the reception of the job signal and ends by the calling of an end-job routine. It should however be noted that the job signal itself normally does not include any instructions, only a pointer to instructions in the software code stored in the program store 47, and operands required in the execution of the instructions.

Preferably, the execution pipelines 45A–D independently fetch job signals from different storage positions in the job queue 42 to independently execute different jobs in parallel. Whenever an execution pipeline is free to start executing a new job, the job queue 42 is examined to find an unallocated job signal. The job signal is then processed in the execution pipeline and the corresponding job is executed. In this particular example, four pipelines are operable for executing four different jobs in parallel, independently of each other. At all times during parallel job execution, only one job signal in the job queue 42 is in commit position, allowing the execution pipeline to which the job signal is assigned to commit the corresponding job, i.e. performing write-back to the memory system. The jobs in the other execution pipelines are executed speculatively and may be flushed if a data dependency is detected by the dependency-checking unit 46.

A general requirement for systems where the information flow is governed by protocols is that certain related events must be processed in the received order. This is the invariant of the system, no matter how the system is implemented. The commit order between jobs is normally defined by the arrival to the processing core and will generally not be changed. However, in a processing system handling job signals of different priority levels, it may be useful to put a job signal of higher priority level before job signals of lower priority. In general, jobs within the same priority level are committed in the same order as they arrived.

In general, each execution pipeline comprises circuitry for fetching instructions from the program store, decoding the instructions, executing the instructions and performing memory write back. An example of a specific execution pipeline that can be used by the invention is the pipeline in the Ericsson AXE Digital Switching Systems.

Preferably, the job queue 42 manages the protocol needed for assigning job signals to the execution pipelines 45A–D, successively assigning commit priority to the job signals, one job signal at a time, and removing job signals that have been committed. The job queue 42 is a queue with a number of storage positions, combined with control functionality to handle the queue. Each storage position in the job queue 42 is divided into a number of fields, for example as described in Table 1 below.

TABLE 1

| Field name | Description | Width (bits) |
|---|---|---|
| Valid | If set, the storage position contains a valid job | 1 |
| Taken | If set, the job signal has been taken by an execution pipeline | 1 |
| Job number | A monotonically increasing number is given to the job when received from the scheduling unit | 5 |
| Signal | The signal header and data | 128 |

When a job signal is received from the job scheduler 30, it is placed in the first free position of the job queue 42, i.e. a position in which the Valid flag is not set. The Valid flag is then set to indicate that the Signal field now contains a valid job signal, and that the position is occupied. When an execution pipeline fetches a job signal from a storage position in the job queue 42, the Taken flag for that position is set to indicate that the job signal has been allocated or assigned.

Preferably, the job queue 42 has a pointer that points out which storage position in the job queue that is in commit position. The job signal in the commit position has commit priority, and the execution pipeline handling this job signal is enabled to perform write-back to the data store 48 and send job signals to the job scheduler 30. When a job signal is moved into commit position, the corresponding pipeline starts to commit all write operations and signal sendings for the job. When this has been done, the position is released by clearing the Valid flag and the job queue 42 is stepped by conventional means to move a new position into commit position. The job scheduler 30 is informed that the job has been executed to completion and the job queue 42 is now ready to receive a new job signal from the scheduler.

The dependency-checking unit 46 is generally implemented by using one or more read buffers associated with the execution pipelines 45A–D. When a pipeline fetches data from the data store 48, the read address or addresses are buffered in the read buffer(s). When the execution pipeline with commit priority performs write-back to the data store 48, the write address to the data store is compared to the read addresses in the read buffer(s) to see if there are data dependencies between the jobs. If data read by a speculatively executing job is subsequently modified by the committed job, a data dependency exists and the speculatively executed job has to be flushed and restarted. The flushed job can be restarted directly from the job queue 42. Job signals corresponding to jobs that have been committed are removed from the job queue 42, thereby allowing new job signals from the job scheduler 30 to be buffered in the job queue 42.

Data store modifications proposed by a speculatively executed job are logged in the temporary write queue 46 but not written into the data store 48 until the job gets commit priority. When a job gets commit priority, the entries in the temporary write queue 46 that belong to the job in question are immediately written into the data store 48. Job signals generated by a job with commit priority are forwarded to the job scheduler 30 as so-called "synchronous" job signals, where they are directed either to the job buffers awaiting later processing or sent to an input/output device (not shown) to be distributed to an external unit.

An example of a specific type of dependency checking unit and temporary write queue is disclosed in the international patent application WO 88/02513.

The memory system advantageously uses both instruction level cache and data level cache memories (not shown) to allow relatively fast access to the instructions and data that currently reside in the cache memories (previously copied from the main memory). The use of cache memories minimizes the need to access the main memory.

When new job signals are released from the job scheduler, these job signals will normally have higher priority than the job signals that are currently being processed, giving an interrupt of the non-speculative commit job and a flush of the speculative jobs. Now, all processing units have to be filled with job signals on the new and higher priority level as fast as possible. By having a delay queue for each priority level, the job signals of the highest priority level can be transferred to the job scheduler first. This is clearly advantageous if the bottleneck (limited bandwidth) in filling up the processing units is in the first step of transferring job signals into the job scheduler, and not in the second step of forwarding scheduled job signals to the processing units.

Figure 4:
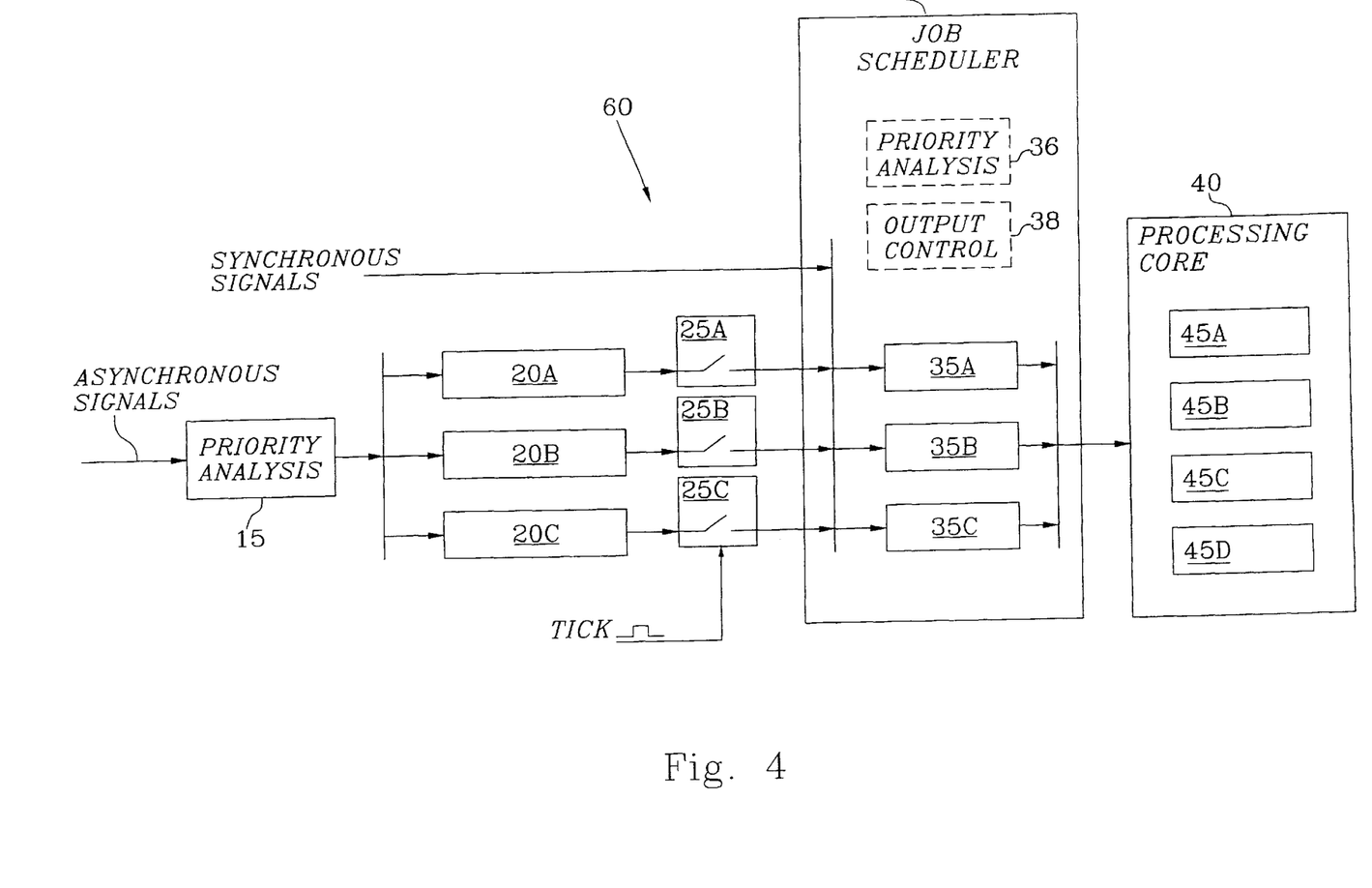
FIG. 4 is a schematic diagram of a processing system according to a second embodiment of the invention.

FIG. 4 is a schematic diagram of a processing system according to a second embodiment of the invention. The processing system 60 comprises a priority analysis unit 15, a number of delay queues 20A–C, a corresponding number of switches 25A–C, a job scheduler 30 and a processing core 40. The job scheduler 30 comprises a number of job buffers 35A–35C, a priority analysis unit 36 and an output control unit 38. Each delay queue is associated with a predetermined priority level for storing job signals of the corresponding priority level. When an asynchronous signal arrives to the priority analysis unit 15, the signal header is analyzed and the delay queue into which the job signal should be placed is identified, and the job signal is subsequently stored therein. Each one of the job buffers 35A–C in the scheduler 30 is associated with a predetermined priority level for storing job signals of the corresponding priority level. In operation, the job signals of each delay queue are inserted into its respective job buffer by the corresponding switch controlled by a tick period counter (not shown). By appropriately controlling the switches 25A–C, the job signals of a selected one of the delay queues can be transferred to the corresponding job buffer, and this makes it possible to begin the transfer of job signals to the job scheduler at the highest priority level.

The priority analysis unit 36 in the job scheduler is utilized for handling synchronous job signals that are not passed through the delay queues 20A–C.

In a software implementation, it is advantageous to build the delay queues 20A–C and the job buffers 35A–C as linked list or queue segments in a common memory. By using linked lists, an entire list of job signals can be moved between a delay queue and its corresponding job buffer simply by linking the head element of the delay queue to the tail of the job buffer.

Yet another variation is to use fixed size memory segments for temporarily holding a number of job signals, or pointers thereto. Each one of the delay queues and job buffers is then built using one or several queue segments, either as a linked list of segments or by having table of pointers to segments. When asynchronous job signals are transferred to a job buffer, the current queue segment is linked out of the corresponding delay queue and inserted into the job buffer.

Many commercial operating systems such as Unix and Windows NT work with processes. In such processing systems, each incoming signal originating from events in the system or from communication messaging, is directed to a corresponding process, and scheduling is performed on the processes and not based on the incoming signals. In the following, an implementation of a processing system having an execution model based on processes will be described.

Figure 5:
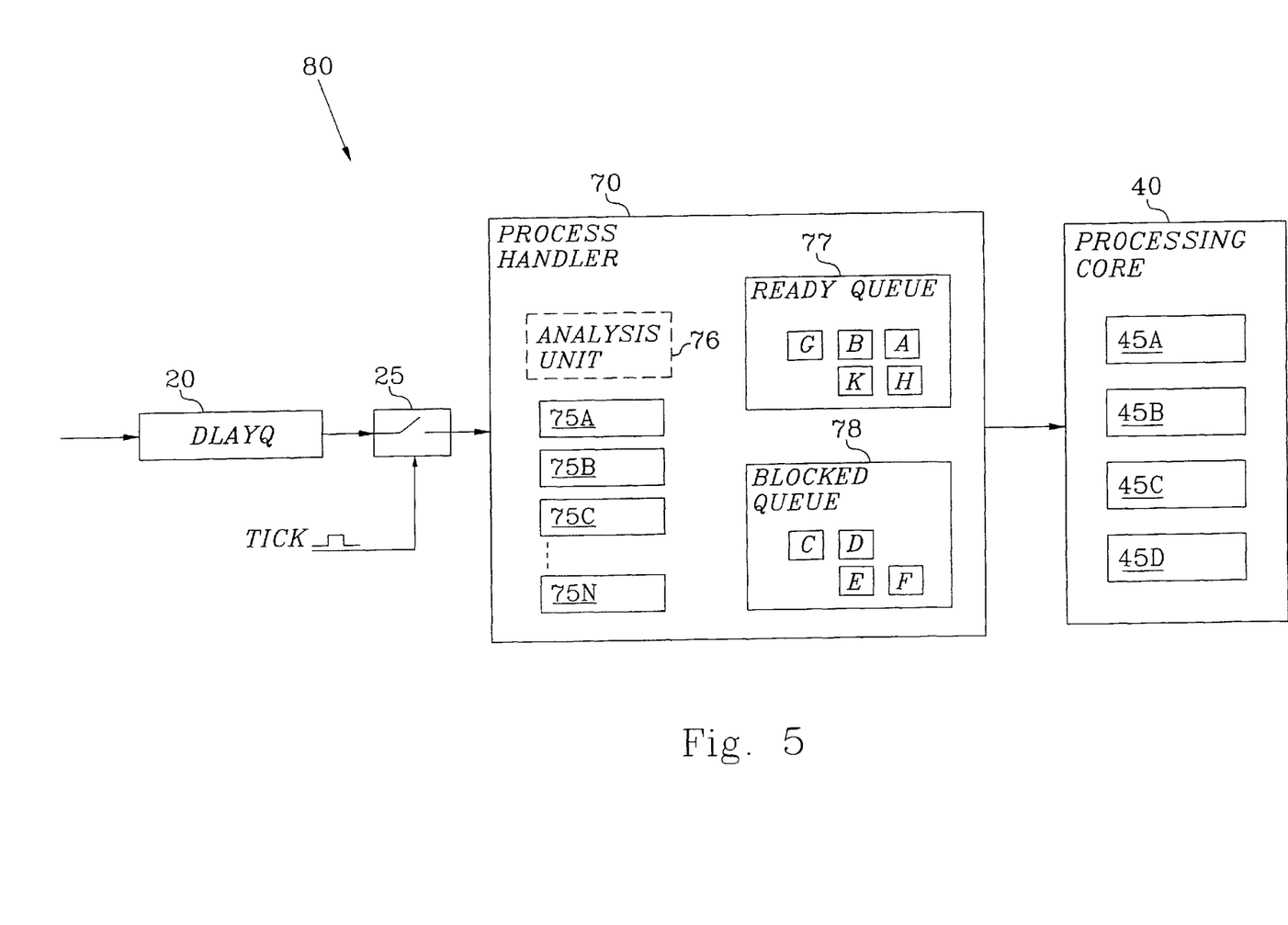
FIG. 5 is a schematic diagram of a processing system according to an alternative embodiment of the invention.

FIG. 5 is a schematic diagram of a processing system according to an alternative embodiment of the invention. The processing system 80 comprises a delay queue 20, a switch 25 controlled by a tick period counter, a process handler 70 and a processing core 40.

The delay queue 20 receives incoming process signals and is adapted for temporarily storage and delay of these signals. The process signals in the delay queue 20 are inserted batch-wise into the process handler 70 under the control of the switch 25. The process handler 70 may be any of a number of conventional process handlers. By way of example, the process handler 70 comprises a number of signal message queues 75A–N, an analysis unit 76, a ready queue 77 and a block queue 78 and conventional circuitry (not shown) for controlling the queues. The process handler 70 is operable for directing the process signals received from the delay queue 20 to corresponding processes and for scheduling the processes for execution in order of their priority level.

For example, process signals can be associated to corresponding processes by having a signal message queue for each process. In FIG. 5, the message queue 75A corresponds to process A, the message queue 75B to process B, and so on. In general, each incoming process signal includes a signal message and a signal header. The header contains administrative information such as a process number. In this case, when a new process signal arrives to the process scheduler 30 the header is analyzed in the analysis unit 76 and the signal message queue into which the signal message of the process signal should be placed is identified, and the signal message is placed in the identified queue.

The operating system of the processing system 80 works with a number of processes having different priority levels. A process is represented by its process control block. A number of process control blocks are indicated as squares in the ready queue 77 and the blocked queue 78. Block A corresponds to process A, block B corresponds to process B, and so on. The process control block generally holds the process state (program counter, register information) when the process is not executing in the processing core 40 as well as administrative information (the priority level, unique id) required by the operating system. A process can be either READY, waiting in the ready queue 77 for execution in the processing core 40, EXECUTING in the processing core 40, or BLOCKED, waiting for an external signal message in the blocked queue 78. A blocked process wakes up on arrival of an external signal message or event associated with the blocked process. The process is then moved to the ready queue 77, awaiting execution in the processing core 40. During execution of a process, say process N, the program reaches a WAIT routine in which the signal messages stored in the signal message queue, i.e. message queue 75N, that corresponds to the executing process are fetched by the program and used in the execution.

The ready queue is usually a linked list of process control blocks. When a process becomes ready it gets scheduled, inserted into the list according to its priority level. When the process has come to the head of the list, the process is dispatched for execution as soon as the processing units 45A–D are available.

By delaying the process signals and inserting the delayed process signals batch-wise to the process handler, the same advantages as for job signals are obtained. The multiple processing units are operates more efficiently and the number of changes between different priority levels is minimized.

Depending on the details of the execution mode, internal messages can be either inserted into the delay queue or directly unblocking the target process. Many execution models require that a higher priority process immediately becomes unblocked and scheduled, and preempts the executing process. Internal messages, analogous to the synchronous signals mentioned above, must then bypass the delay queue.

It should furthermore be noted that some systems allow process signals to have different priority levels (not only the processes). Process signals carrying error messages and other urgent messages for example may have high real time demands and should then bypass the delay queue. This of course also applies to job signals carrying error messages and other urgent messages.

Basically, error messages are expected to be very rare and should not effect the overall processing capacity of the system.

For additional information on process-oriented operating systems and execution models, please refer to *Operating System Concepts* by Silberschatz and Peterson, Addison-Wesley Publ. Co., 1988, pp 149–185.

The invention is not dependent on the way parallelism is extracted from the application. For example, the processing system can be used for event-controlled processing, where each event, perhaps in the form of a service request, initiates a sequence of jobs that corresponds to a requested service. The processing system can also be used in applications where the parallelism originates from parallel execution methods in an object-oriented program or extracted by a compiler when compiling a single large program.

The embodiments described above are merely given as examples, and it should be understood that the present invention is not limited thereto. Further modifications, changes and improvements that retain the basic underlying principles disclosed and claimed herein are within the scope of the invention.

What is claimed is:

1. A processing system comprising:

multiple processing units for parallel processing of job signals of different priority levels;

a job scheduler for scheduling the job signals for processing by the processing units in order of the priority level of the job signals, said job scheduler including a plurality of job buffers that store the job signals before the job scheduler passes the job signals to the processing units, each of the job buffers storing job signals of a different priority level;

at least one delay queue for temporarily delaying the job signals before the job signals reach the job buffers in the job scheduler, said delay queue temporarily storing the job signals until a batch of job signals accumulates in the delay queue; and means for extracting the temporarily stored job signals as a batch from the delay queue and inserting the batched job signals into the job scheduler, whereby, due to the insertion of job signals in batches, the multiple processing units are enabled to operate at a higher load level, and the number of changes between different priority levels of job signals in the processing units is minimized.

2. The processing system according to claim 1, further comprising a counter that controls the extracting means to extract the batch of temporarily stored job signals from the delay queue and insert the batched job signals into the job scheduler whenever the counter expires, wherein batches of temporarily stored job signals are periodically inserted into the job scheduler.

3. The processing system according to claim 1, further comprising a memory that stores the job signals until needed by the processing units, and wherein the delay queue is a queue of pointers that point to the job signals in the memory, and the means for extracting the batch of temporarily stored job signals from the delay queue and inserting the batched job signals into the job scheduler moves pointers from the delay queue to the job scheduler.

4. The processing system according to claim 1, wherein the batched job signals is inserted into the job scheduler when the delay quences becomes full.

5. The processing system according to claim 1, further comprising a number plurality of delay queues, each one of the delay queues being associated with a predetermined priority level for temporarily delaying job signals of the associated priority level.

6. The processing system according to claim 1, wherein the processing units are operable for processing job signals to independently execute different jobs in parallel, one of the parallel jobs being executed non-speculatively, and the remaining jobs being executed speculatively.

7. The processing system according to claim 5, wherein the means for extracting the batch of temporarily stored job signals from the delay queue and inserting the batched job signals into the job scheduler is operable for inserting the batched job signals of a selected one of the delay queues into a selected one of the job buffers in the job scheduler.

8. The processing system according to claim 5, wherein the means for extracting the batch of temporarily stored job signals from the delay queue and inserting the batched job signals into the job scheduler is operable for inserting the batched job signals of a selected one of the delay queues into a selected one of the job buffers in the job scheduler having a priority level corresponding to the priority level of the selected delay queue.

9. The processing system according to claim 5, wherein the delay queues and the job buffers in the job scheduler are built based on linked lists or queue segments in a memory, and the means for extracting the batch of temporarily stored job signals from the delay queue and inserting the batched job signals into the job scheduler is operable for inserting the batched job signals of a predetermined one of the delay queues into the job scheduler by linking a head element of the delay queue to a tail of a corresponding job buffer.

10. The processing system according to claim 6, wherein the job scheduler is operable for initiating an interrupt of the non-speculatively executed job and initiating flush of the speculatively executed jobs, upon reception of a job signal having a priority level that is higher than that of the jobs in the processing units.

11. The processing system according to claim 8, wherein if the processing units complete the processing of a batch of job signals having a high priority level prior to receiving another batch of job signals having the high priority level, the processing units process batches of lower priority job signals until another batch of job signals having the high priority level is received.

12. A method of handling job signals of different priority levels in a processing system having multiple processing units for parallel processing of job signals, and a job scheduler comprising a plurality of job buffers that store the job signals and insert the job signals into the processing units in descending order of priority level, said method comprising the steps of:

delaying the job signals prior to the scheduler in a plurality of delay queues until a batch of job signals is received in each delay queue, wherein the step of delaying the job signals is performed on a priority basis such that job signals of different priority levels are input into different delay queues;

extracting the job signals from each delay queue as a batch, and inserting the batched job signals into a job buffer in the job scheduler having a corresponding priority level; and scheduling the job signals for processing by the processing units in order of the priority level of the job signals, said scheduling step including:
storing each received batch of job signals in a job buffer in the job scheduler having a priority level corresponding to the priority level of the received batch of job signals; and
passing the batches of job signals to the processing units in descending order of the priority levels;

whereby the multiple processing units are enabled to operate at a higher load level, and the number of changes between different priority levels of job signals in the processing units is minimized.

13. The method according to claim 12, wherein each delay queue is associated with a corresponding job buffer in the scheduler, the delay queues and the job buffers being based on linked list segments, and the step of extracting the job signals from each delay queue as a batch, and inserting the batched job signals into the job scheduler includes the step of linking the head of each delay queue to the tail of the corresponding job buffer.

14. The method according to claim 12, further comprising, if the processing units complete the processing of a batch of job signals having a high priority level prior to receiving another batch of job signals having the high priority level, processing batches of lower priority job signals until another batch of job signals having the high priority level is received.

15. A scheduler for scheduling process signals for processing in a processing system having multiple processes that execute the process signals in order of descending priority level, said scheduler comprising:

a process handler for directing the process signals to corresponding processes and for scheduling the processes to execute the process signals in descending order of priority level;

at least one delay queue for temporarily delaying the process signals prior to the process handler until a batch of process signals is accumulated in the delay queue; and means for inserting the temporarily delayed process signals into the process handler as a batch, whereby the multiple processing units are enabled to operate at a higher load level, and the number of changes between different priority levels of process signals in the processes is minimized.

16. The scheduler according to claim 15, wherein the process signals are stored in a memory, the delay queue is a queue of pointers to the process signals in the memory, and the means for inserting the temporarily delayed process signals into the process handler as a batch moves pointers from the delay queue to the process handler.

17. The scheduler according to claim 15, further comprising a counter that periodically controls the inserting means to insert the batch of temporarily delayed process signals into the process handler when the counter expires.

18. The scheduler according to claim 15, wherein the inserting means inserts the batch of temporarily delayed process signals into the process handler whenever the delay queue becomes full.

19. The scheduler according to claim 17, wherein the inserting means inserts the batch of temporarily delayed process signals into the process handler when the delay queue becomes full, if the delay queue becomes full prior to the counter expiring.

* * * * *